(12) United States Patent
Kodaveridan et al.

(10) Patent No.: US 6,719,623 B1
(45) Date of Patent: Apr. 13, 2004

(54) REMOTE CONTROLLED AIR CONDITIONING NOZZLE

(75) Inventors: Levik Kodaveridan, La Crescenta, CA (US); David Garakanian, Glendale, CA (US)

(73) Assignee: Hybrid Systems, Glendale, CA (US)

( * ) Notice: Subject to any disclaimer, the term of this patent is extended or adjusted under 35 U.S.C. 154(b) by 0 days.

(21) Appl. No.: 10/290,864

(22) Filed: Nov. 8, 2002

(51) Int. Cl.$^7$ .................................. B64D 13/00
(52) U.S. Cl. ..................... 454/76; 454/154; 454/305
(58) Field of Search ..................... 454/76, 154, 305, 454/333, 334, 322, 323, 327

(56) References Cited

U.S. PATENT DOCUMENTS

| | | |
|---|---|---|
| 4,135,440 A | 1/1979 | Schmidt et al. |
| 5,044,259 A * | 9/1991 | Catan et al. ............. 454/306 |
| 5,275,333 A | 1/1994 | Tamblyn |
| 5,361,981 A | 11/1994 | Albert et al. |
| 5,467,919 A | 11/1995 | Tamblyn |
| 5,810,245 A | 9/1998 | Heitman et al. |
| 5,860,593 A | 1/1999 | Heinle et al. |

\* cited by examiner

Primary Examiner—Harold Joyce
(74) Attorney, Agent, or Firm—Chan Law Group LC

(57) ABSTRACT

A device that allows a sitting airline passenger to control the direction and volume of the airflow from an overhead air conditioning nozzle by manipulating a remote control keyboard located near the passenger. It increases an individual's thermal comfort in an aircraft cabin by allowing the individual to regulate the thermal conditions at their seat. The present invention also allows an individual-supplemental air volume to be introduced into an aircraft cabin by means of individual spreadable and adjustable air outlets to provide a "local" climate zone that is distinct from the basic cabin climate or condition. The present invention also provides a means of remote passenger manipulation of the individual-supplemental air volume and direction and all from the comfort of the passenger seat.

9 Claims, 12 Drawing Sheets

REMOTE CONTROLLED AIR CONDITIONING NOZZLE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

FIELD OF INVENTION

The present invention relates to a device that allows a sitting person to adjust the direction and volume of the airflow from an air conditioning duct and more particularly, allows a passenger to control the direction and volume of the airflow from an air conditioning nozzle by manipulating a remote control keyboard located near the passenger.

BACKGROUND OF THE INVENTION

The ability of people to concentrate, to perform at work or to enjoy life to some extent is dependent upon their thermal comfort. Individual regulation of the thermal conditions at each occupant location is of great practical importance. A uniform room climate does provide a comfortable thermal environment for each occupant. Individual body heat transfer rates vary a great deal. It can vary due to differences in individual body heat production, different activities, the state of health of the individual, or their varying clothing habits. Therefore, a large room with a uniform room climate or an airplane fuselage is rarely simultaneously comfortable for all occupants. The varying comfort levels are accommodated by passenger adjustment of the direction and volume of air output by the supplemental air volume.

Air-conditioned rooms with constant temperature and air velocity lack that stimulatory effect achieved out of doors in a natural environment. Opening the windows of a small room will increase this stimulatory effect.

The total volume of conditioned air being fed into a room can be supplied in two distinct parts. A first part, called the primary air volume, establishes a basic room climate. The room air conditioning system provides a warm primary or "basic" overall room climate with low air velocity to accommodate a wide range of varying occupant needs. This type of system satisfies medical warnings against air streams impinging directly upon a small area of the body.

A second part, called the individual supplemental air volume, is introduced into the room by means of individually controlled adjustable air outlets. It allows for local or zonal climate adjustability that satisfies individual tastes and is distinct from the basic room climate.

Manually controlled air conditioning nozzles are employed on airliners and other means of transit to provide individual supplemental air volume. The nozzle is often located above and forward of the seat. A passenger must reach above their head and direct the nozzle and also adjust the volume of air passing through it. A short passenger or a passenger located near in an aisle seat must get up from their seat to perform the manual manipulation of the nozzle. The passenger must guess at the volume and direction settings because she is out of her seated position and is not able to feel the effect of these manipulations. The passenger often must repeat the adjustment process several times before reaching a satisfactory setting. This iterative process is uncomfortable for the passenger as well as and the neighboring passengers. Passengers typically perform this adjustment after locating their seat and stowing carry-on baggage. The neighboring passengers are also trying to locate their seat and stow their baggage. The passenger manipulation increases the amount of time required to get all of the passengers settled and ready for departure.

What is needed is a device that increases a passenger's thermal comfort through remote control of the direction and volume of the individual supplemental air at each seat. The device should also allow a local climate zone that is distinct from the basic room climate or condition.

BRIEF SUMMARY OF THE INVENTION

The invention resides in a remote controlled air conditioning nozzle. The remote controlled air conditioning nozzle includes a housing.

An air nozzle is also included. The air nozzle is spherically connected into the housing. The air nozzle has an air passageway with an input end and an output end. The input end has an outer surface. Conditioned air enters the input end and exits the output end.

At least one electric motor is provided. A means for spherically changing the output direction of the air nozzle is provided. The air nozzle has a means for changing the volume of air output. The means for spherically changing the output direction of the air nozzle is propelled by at least one electric motor. The means for changing the volume of air output is also propelled by the at least one electric motor.

A remote control is also included. The remote control directs the means for spherically changing the output direction of the air nozzle and the means for changing the volume of air output by the air nozzle.

In a variant of this invention, the remote control is located near the seat occupant.

In another variant of this invention, an air supply line is included. The air supply line brings air into the input end of the air nozzle.

In yet another variant of this invention, the outer surface of the input end of the air nozzle has a spherical contour.

In another variant of this invention, the means for spherically changing the output direction of the air nozzle further includes at least one pivot hinge. The at least one pivot hinge has a hinge pin and a hinge pin receiver. The hinge pin is disposed on the outer surface of the input end of the air nozzle. The hinge pin receiver is disposed on the housing. The hinge pin is installed into the hinge pin receiver such that the air nozzle can pivot on the at lease one pivot hinge.

In a variation of this invention, the housing has a sprocket. The sprocket has gear teeth evenly spaced around a circular outer perimeter. The sprocket has an inner perimeter. It also has an upper surface and a lower surface. The sprocket has at least one hinge pin receiver located on the inner perimeter. The air nozzle is disposed within the sprocket such that at least one hinge pin is installed into the at least one hinge pin receiver. The housing has a lower lip. The sprocket rests on ball bearings sandwiched between its lower surface and the lower lip of the housing. The sprocket is rotatable on the ball bearings. The sprocket rotates about a vertical axis running through the center of the circular outer perimeter. The sprocket receives rotational impetuous from the at least one electric motor.

Another variation of this invention further includes a first hinge pin and a second hinge pin located on the outer surface of the input end of the air nozzle. The sprocket has a first hinge pin receiver and a second hinge pin receiver located on the inner perimeter. The second hinge pin receiver is vertically offset from the first hinge pin receiver.

In again another variant of this invention, the means for spherically changing the output direction of the air nozzle further includes locating at least one groove pin on the outer surface of the input end of the air nozzle. At least one groove is located on the housing. The air nozzle is positioned within the housing such that the at least one groove pin slideably fits within the at least one groove.

In even another variant of this invention, the at least one groove is sinusoidal shaped and the at lease one groove pin is being pushed into the at least one groove by a spring.

In yet again another variation of this invention, the means for changing the volume of air output by the air nozzle includes a damper flap. The damper flap has at least one rotation pivot hinge. The damper flap is sized and shaped to rotate on the at least one rotation pivot hinge to change the volume of air entering the air nozzle.

In even another variation of this invention, the means for spherically changing the output direction of the air nozzle includes a bushing with a top surface and a central receiving hole. A coupler is provided. The coupler has a perimeter, a top surface, a bottom surface and a central rotation shaft. The perimeter of the coupler has evenly disposed gear teeth. The central rotation shaft has a centerline. A drive shaft is attached to an engager. The drive shaft has a centerline. The engager has a T shape. The central rotation shaft is installed through a biasing means and into and through the central receiving hole. The biasing means pushes against the bottom surface of the coupler and the top surface of the bushing. The coupler has at least one ramp with an end notch concentrically located on the top surface near the perimeter. The engager is shaped, sized and located such that the centerline of the drive shaft is co-linear to the centerline of the central rotation shaft when the engager is in contact with the at least one ramp. The at lease one ramp and end notch are disposed such that when the engager is rotated in a first direction, the engager locks against the end notch and rotates the coupler. The gear teeth of the coupler engage the gear teeth of the sprocket to impart rotation into the sprocket. Rotation of the sprocket causes the air nozzle to rotate on the first hinge pin and the second hinge pin and slide the at least one groove pin along the at least one groove, resulting in the spherical rotation the air nozzle. When the engager is rotated in the second direction, the engager rides up the at least one ramp pushing the coupler against the biasing means without locking against the end notch. The coupler does not rotate.

In even another variation of this invention, the means for changing the volume of air output by said air nozzle also includes a bushing with a top surface and a central receiving hole. A coupler is provided. The coupler has a perimeter, a top surface, a bottom surface and a central rotation shaft. A drive shaft is attached to an engager. The drive shaft has a centerline. The engager has a T shape. The central rotation shaft is installed through the biasing means and into and through the central receiving hole. The biasing means pushes against the bottom surface of the coupler and against the top surface of the bushing. The coupler has at least one ramp with an end notch concentrically located on the top surface near the perimeter. The engager is shaped, sized and located such that the centerline of the drive shaft is co-linear to the centerline of the central rotation shaft and the engager is in contact with the at least one ramp. The at least one ramp and end notch are disposed such that when the engager is rotated in a second direction, the engager locks against the end notch and rotates the coupler. A flexible shaft is connected to the end of the central rotation shaft that is sticking out through the central receiving hole of the bushing. The flexible shaft is connected concentrically to the at least one rotation pivot hinge of the damper flap. Rotation of the central rotation shaft results in a change in the volume of air output by the air nozzle. When the engager is rotated in the opposite direction, the engager pushes against the at least one ramp driving the coupler against the biasing means. The engager does not lock against the end notch. No rotation is imparted into the coupler.

The air nozzle is capable of seat occupant manual override adjustment instead of remote controlled adjustment.

The invention also resides in a remote controlled air conditioning nozzle with three motors. The remote controlled air conditioning nozzle includes a housing.

An air nozzle is provided. The air nozzle has a first pivotal connection to the housing. The first pivotal connection has a first pivotal axis. The air nozzle has a second pivotal connection to the housing. The second pivotal connection has a second pivotal axis. The second pivotal axis is perpendicular to the first pivotal axis. The air nozzle has an air passageway with an input end and an output end. The input end has an outer surface. Conditioned air enters the input end and exits the output end.

A first motor is provided. The first motor is disposed to propel a first means for pivoting the air nozzle about the first pivotal connection.

A second motor is provided. The second motor is disposed to propel a second means for pivoting the air nozzle about the second pivotal connection.

A third motor is provided. The third motor is disposed to propel a means for changing the volume of air output by the air nozzle.

A remote control is provided. The remote control directs the first means for pivoting the air nozzle about the first pivotal connection, the second means for pivoting the air nozzle about the second pivotal connection and the changing of the volume of air output by the air nozzle.

In a variant of this invention, wherein the means for changing the volume of air output has a worm drive gear attached to the third motor. The worm receiver gear is disposed in relation to the damping device such that when driven by the worm gear, the volume of air output by the air nozzle changes.

In another variant of this invention, the air nozzle has a spherical outer surface region. The spherical outer surface region is cupped in a spherical socket in the housing thus forming a spherically pivotable connection.

In yet another variant of this invention, a swivel plate is sized, shaped and attached to the outer surface of the air nozzle such that the air nozzle is sandwiched between the swivel plate and the spherical socket. The swivel plate has a first corner, a second corner and a third corner.

In still another variant of this invention, the first motor and the means for pivoting the air nozzle about the first pivotal connection includes the first motor being connected by a gear means to the first corner of the swivel plate. The second motor and the means for pivoting the air nozzle about the second pivotal connection further comprises the second motor being connected by a gear means to the second corner of the swivel plate. The third corner is attached by a biasing means to the holding fixture. The first motor and or the second motor is directed by signals sent by the by the remote control to pivot the swivel plate while the third corner of the swivel plate is fixed by the biasing means resulting in the pivoting of the air nozzle while holding the spherical outer surface region in the cupping spherical socket.

In still another variant of this invention, the signals sent by the remote control are transmitted from a central electronic control board.

In again another variant of this invention, the swivel plate is orientated perpendicular to the direction of the output air.

In even another variant of this invention, the swivel plate has a planar shape.

In a variation of this invention, the biasing means is a spring.

The air nozzle is capable of seat occupant manual override adjustment instead of remote controlled adjustment.

The foregoing has outlined the more pertinent and important features of the present invention in order that the detailed description of the invention that follows may be better understood so the present contributions to the art may be more fully appreciated. Additional features of the present invention will be described hereinafter, which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only.

DETAILED DESCRIPTION

The following description is provided for the purpose of describing an example and specific embodiment of the invention only and is not intended to exhaustively describe all possible examples and embodiments of the invention.

Referring more specifically to the drawings, the present invention is embodied in the apparatus generally shown in FIGS. 1 through 15.

The invention resides in a remote controlled air conditioning nozzle 10. The remote controlled air conditioning nozzle includes a housing 14.

Figure 2:
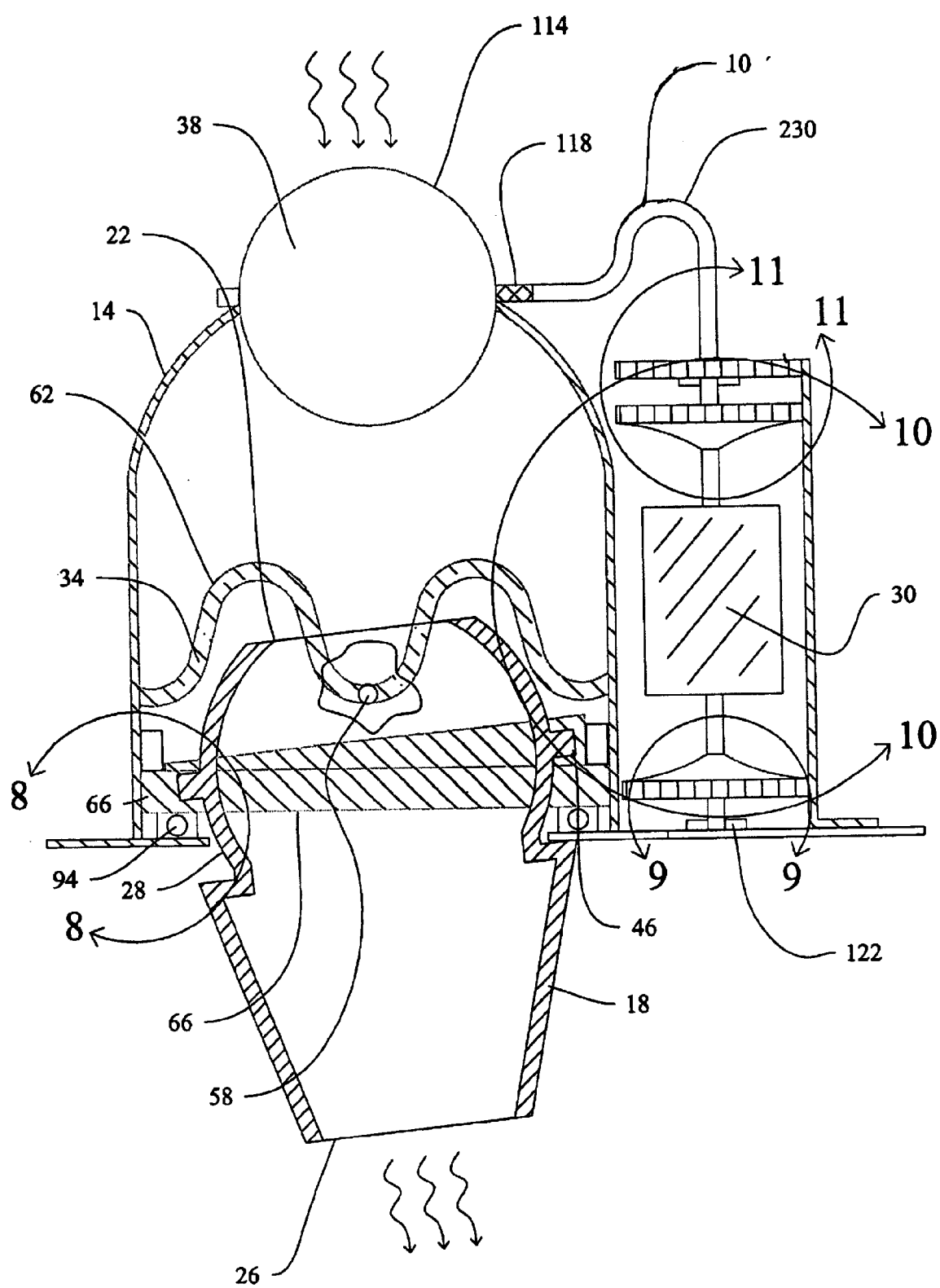
FIG. 2 is a cross sectional view of the at least one motor incarnation of the invention.
Figure 4:
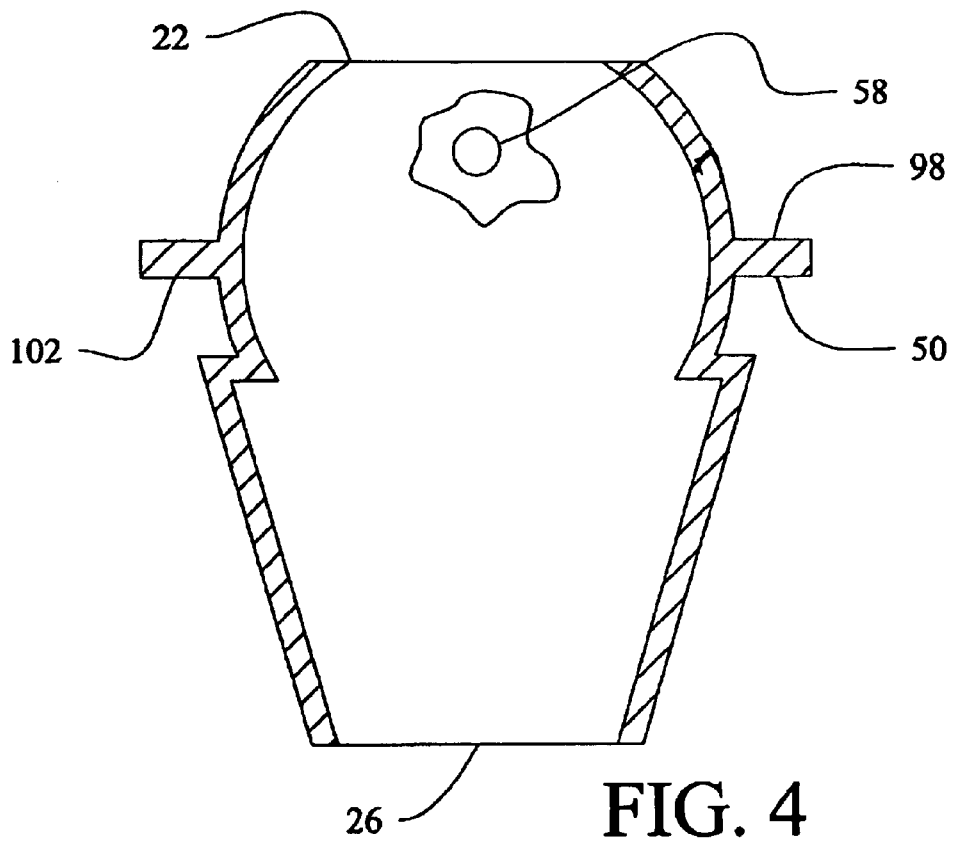
FIG. 4 is a vertical cross sectional view of the air nozzle.
Figure 3:
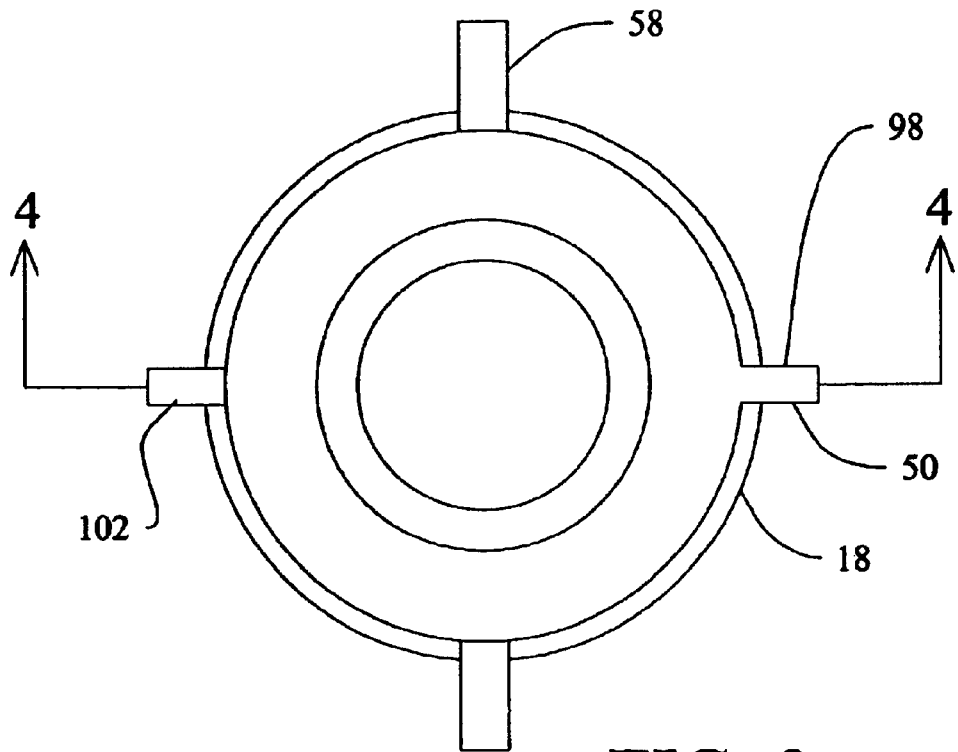
FIG. 3 is a plan view of the air nozzle.

As shown in FIG. 2, an air nozzle 18 is also included. The air nozzle 18 is spherically connected into the housing 14. The air nozzle 18 has an air passageway with an input end 22 and an output end 26. The input end 22 has an outer surface 28. Conditioned air enters the input end 22 and exits the output end 26.

At least one electric motor 30 is provided. A means for spherically changing the output direction of the air nozzle 34 is provided. The air nozzle has a means for changing the volume of air output 38. The means for spherically changing the output direction of the air nozzle 34 is propelled by at least one electric motor 30. The means for changing the volume of air output 38 is also propelled by the at least one electric motor 30.

Figure 1:
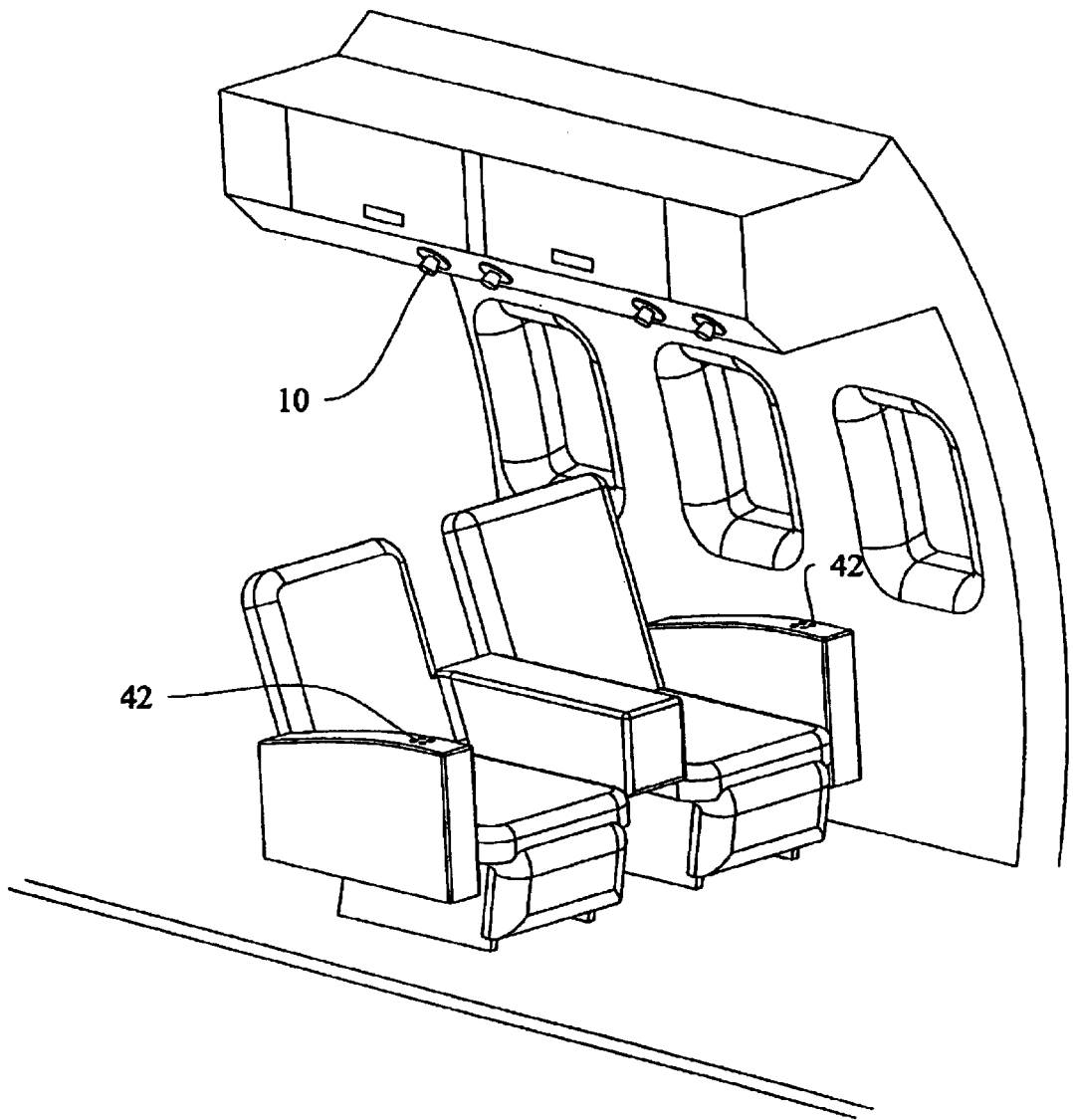
FIG. 1 is a perspective view of an airline seat showing the location for the remote control device and the air nozzle.

As shown in FIGS. 1 and 2, a remote control is also included 42. The remote control 42 directs the means for spherically changing the output direction of the air nozzle 34 and the means for changing the volume of air output by the air nozzle 38.

In a variant of this invention, the remote control 42 is located near the seat occupant.

In another variant of this invention, an air supply line is included. The air supply line brings air into the input end 22 of the air nozzle 18.

In yet another variant of this invention, the outer surface 28 of the input end 22 of the air nozzle 18 has a spherical contour.

As shown in FIG. 2, another variant of this invention has the means for spherically changing the output direction of the air nozzle 34 further including at least one pivot hinge 46. The at least one pivot hinge 46 has a hinge pin 50 and a hinge pin receiver 54. The hinge pin 50 is disposed on the outer surface 28 of the input end 22 of the air nozzle 18. The hinge pin receiver 54 is disposed on the housing 14. The hinge pin 50 is installed into the hinge pin receiver 54 such that the air nozzle 18 can pivot on the at lease one pivot hinge 46.

Figure 6A:
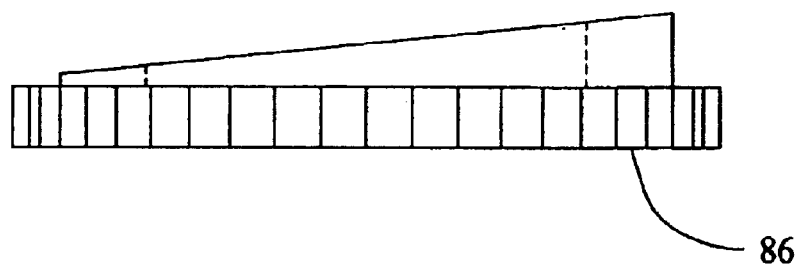
FIG. 6a is a side view of the sprocket.
Figure 6:
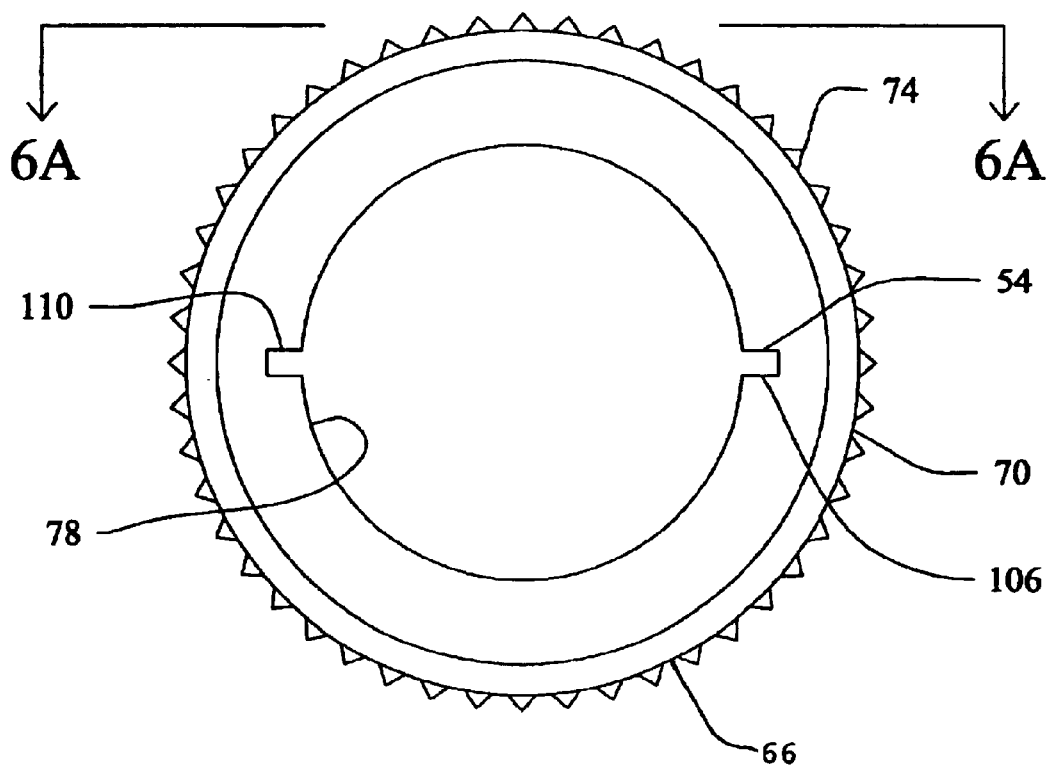
FIG. 6 is a plan view of the sprocket.
Figure 8:
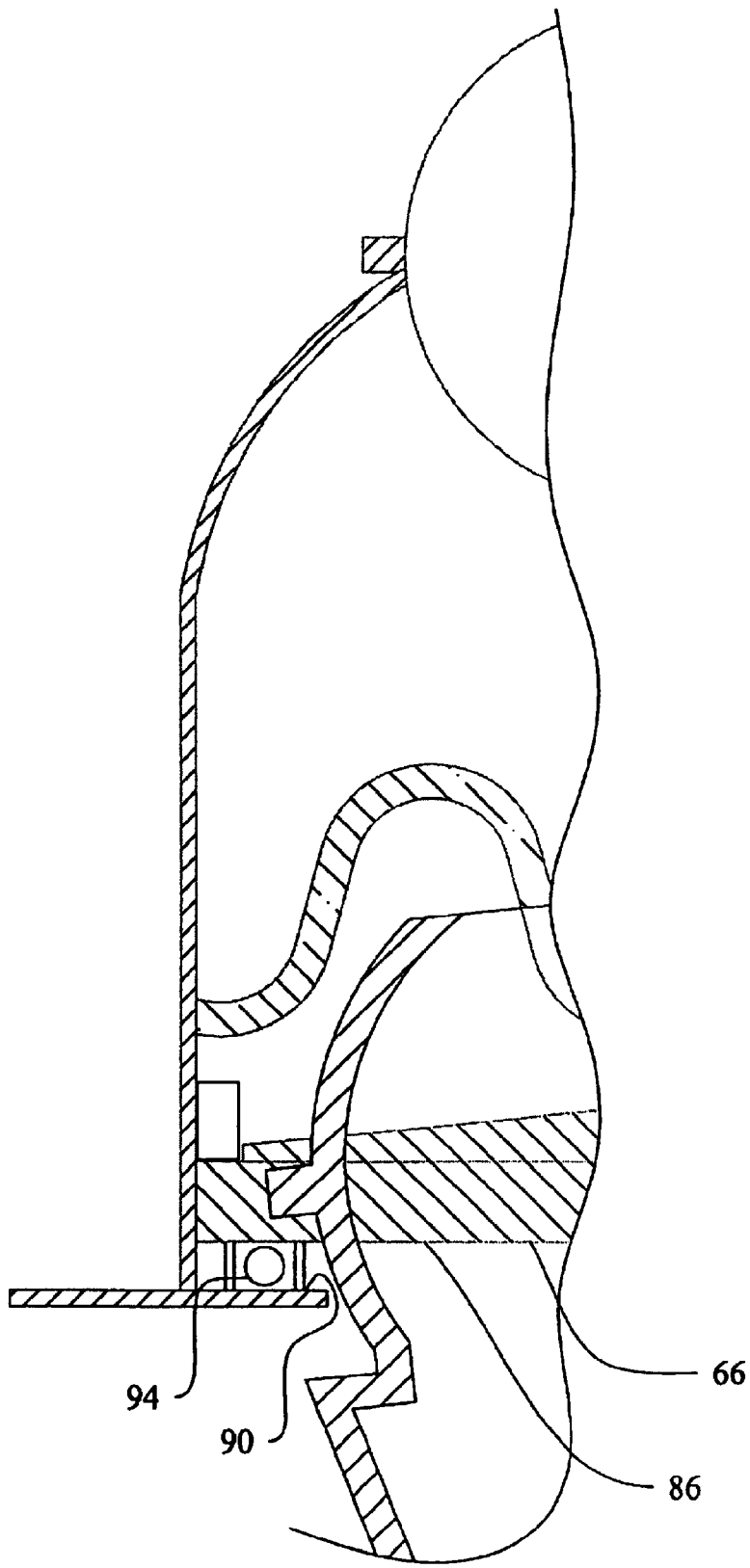
FIG. 8 is a magnified view of the sprocket-to-ball bearings-to-housing interface.

In a variation of this invention, shown in FIGS. 2, 6 and 8, the housing 14 has a sprocket 66. The sprocket 66 has gear teeth 74 evenly spaced around a circular outer perimeter 70. The sprocket 66 has an inner perimeter 70. It also has an upper surface and a lower surface 86. The sprocket 66 has at least one hinge pin receiver 46 located on the inner perimeter 70. The air nozzle 18 is disposed within the sprocket 66 such that at least one hinge pin 50 is installed into the at least one hinge pin receiver 54. The housing 14 has a lower lip 90. The sprocket 66 rests on ball bearings 94 sandwiched between its lower surface 86 and the lower lip 90 of the housing 14. The sprocket 66 is rotatable on the ball bearings 94. The sprocket 66 rotates about a vertical axis running through the center of the circular outer perimeter 70. The sprocket 66 receives rotational impetuous from the at least one electric motor 30.

Another variation of this invention, shown in FIGS. 2, 3, 4 and 6, further includes a first hinge pin 98 and a second hinge pin 102 located on the outer surface 28 of the input end 22 of the air nozzle 18. The sprocket 66 has a first hinge pin receiver 106 and a second hinge pin receiver 110 located on the inner perimeter 70. The second hinge pin receiver 110 is vertically offset from the first hinge pin receiver 106.

Figure 7:
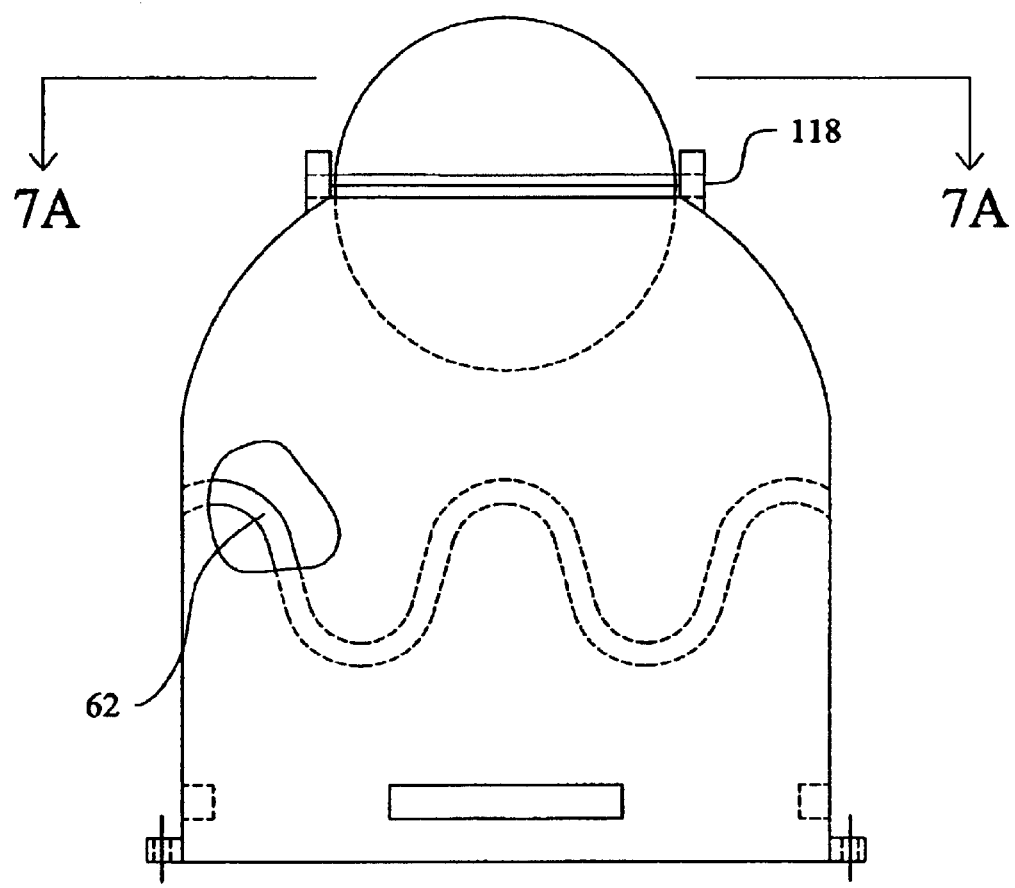
FIG. 7 is a side view of the housing.
Figure 7A:
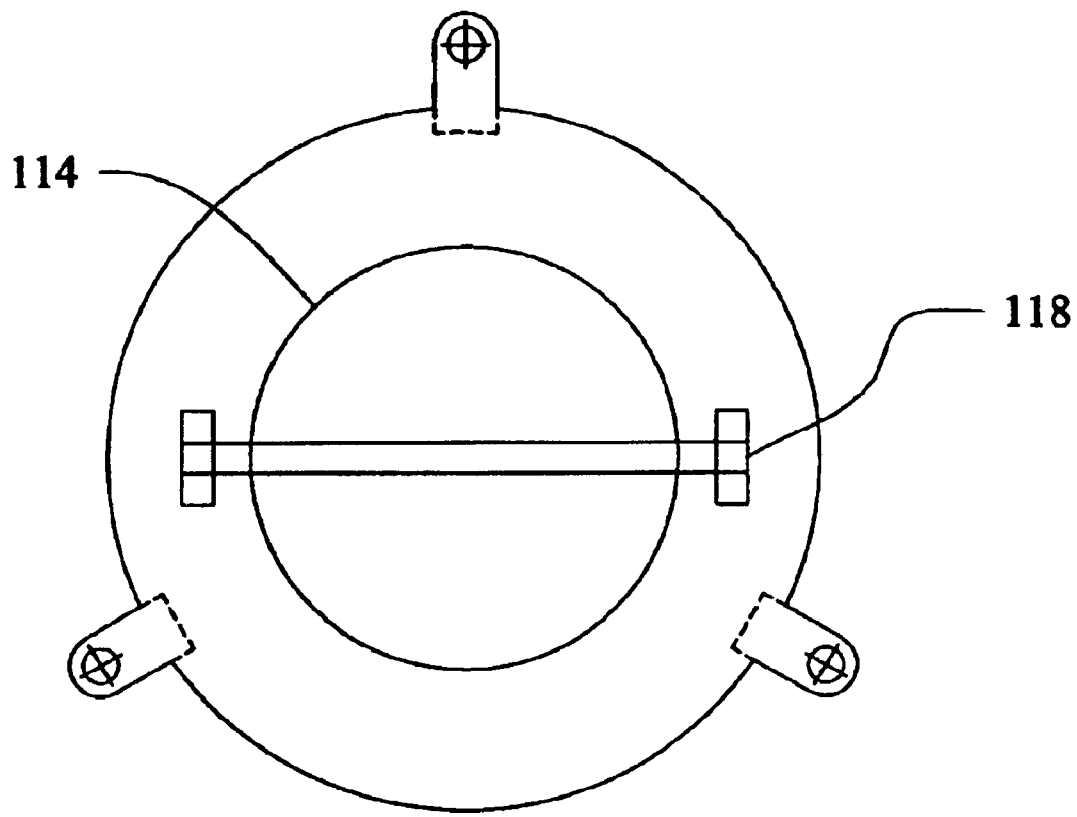
FIG. 7a is a plan view of the housing.

In again another variant of this invention, shown in FIGS. 2 and 7, the means for spherically changing the output direction of the air nozzle 34 further includes locating at least one groove pin 58 on the outer surface 28 of the input end 22 of the air nozzle 18. At least one groove 62 is located on the housing 14. The air nozzle 18 is positioned within the housing 14 such that the at least one groove 58 pin slideably fits within the at least one groove 62.

In even another variant of this invention, the at least one groove 62 is sinusoidal shaped and the at lease one groove pin 58 is being pushed into the at least one groove 62 by a spring.

In yet again another variation of this invention, shown in FIGS. 2 and 7, the means for changing the volume of air output by the air nozzle 38 includes a damper flap 114. The damper flap 114 has at least one rotation hinge 118. The damper flap 114 is sized and shaped to rotate on the at least one rotation hinge 118 to change the volume of air entering the air nozzle 18.

Figure 9:
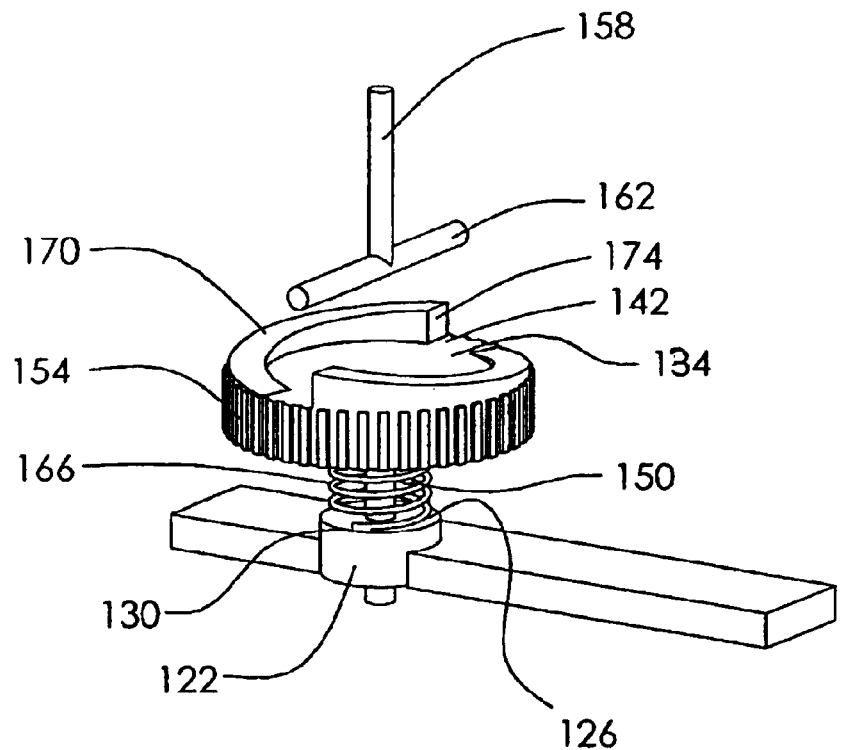
FIG. 9 is a magnified view of the lower engager-to-coupler interface.
Figure 10:
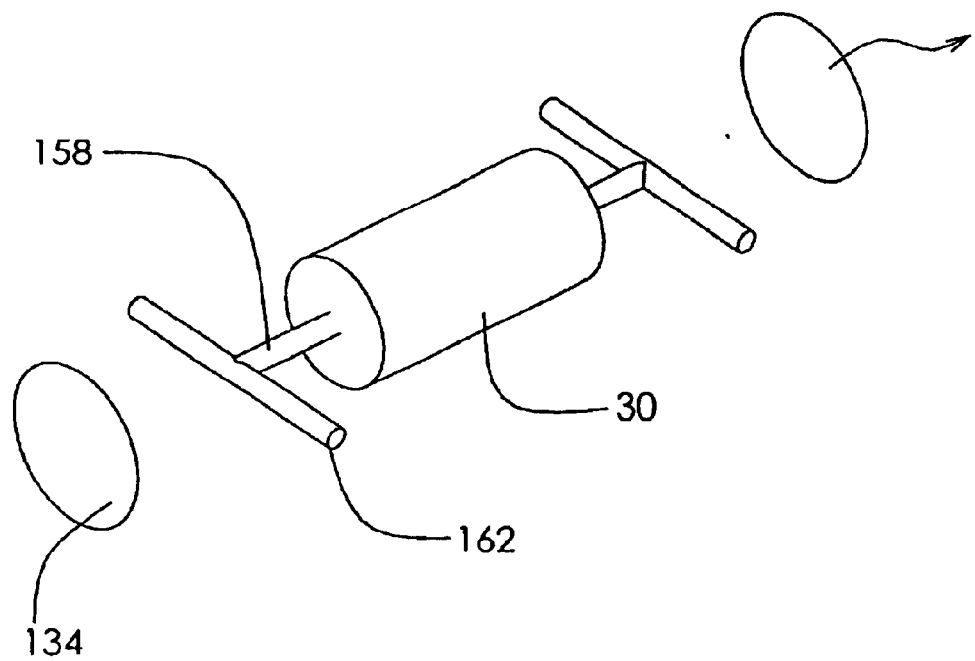
FIG. 10 magnified view of the motor.

In even another variation of this invention, shown in FIGS. 2, 9 and 10, the means for spherically changing the output direction of the air nozzle 34 includes a bushing 122 with a top surface 126 and a central receiving hole 130. A coupler 134 is provided. The coupler 134 has a perimeter 138, a top surface 142, a bottom surface and a central rotation shaft 150. The perimeter 138 of the coupler 134 has evenly disposed gear teeth 154. The central rotation shaft 150 has a centerline. A drive shaft 158 is attached to an engager 162. The drive shaft 158 has a centerline. The engager 162 has a T shape. The central rotation shaft 150 is installed through a biasing means 166 and into and through the central receiving hole 130. The biasing means 166 pushes against the bottom surface of the coupler 134 and the top surface 126 of the bushing 122. The coupler 134 has at least one ramp 170 with an end notch 174 concentrically located on the top surface 142 near the perimeter 138. The engager 162 is shaped, sized and located such that the centerline of the drive shaft 158 is co-linear to the centerline of the central rotation shaft 150 when the engager 162 is in contact with the at least one ramp 170. The at lease one ramp 170 and end notch 174 are disposed such that when the engager 162 is rotated in a first direction, the engager 162 locks against the end notch 174 and rotates the coupler 134. The gear teeth 154 of the coupler 134 engage the gear teeth 74 of the sprocket 66 to impart rotation into the sprocket 66. Rotation of the sprocket 66 causes the air nozzle 18 to rotate on the first hinge pin 98 and the second hinge pin 102 and slide the at least one groove pin 58 along the at least one groove 62, resulting in the spherical rotation the air nozzle 18. When the engager 162 is rotated in the second direction, the engager 162 rides up the at least one ramp 170 pushing the coupler 134 against the biasing means 166 without locking against the end notch 174. No rotation is imparted into the coupler 134.

Figure 5:
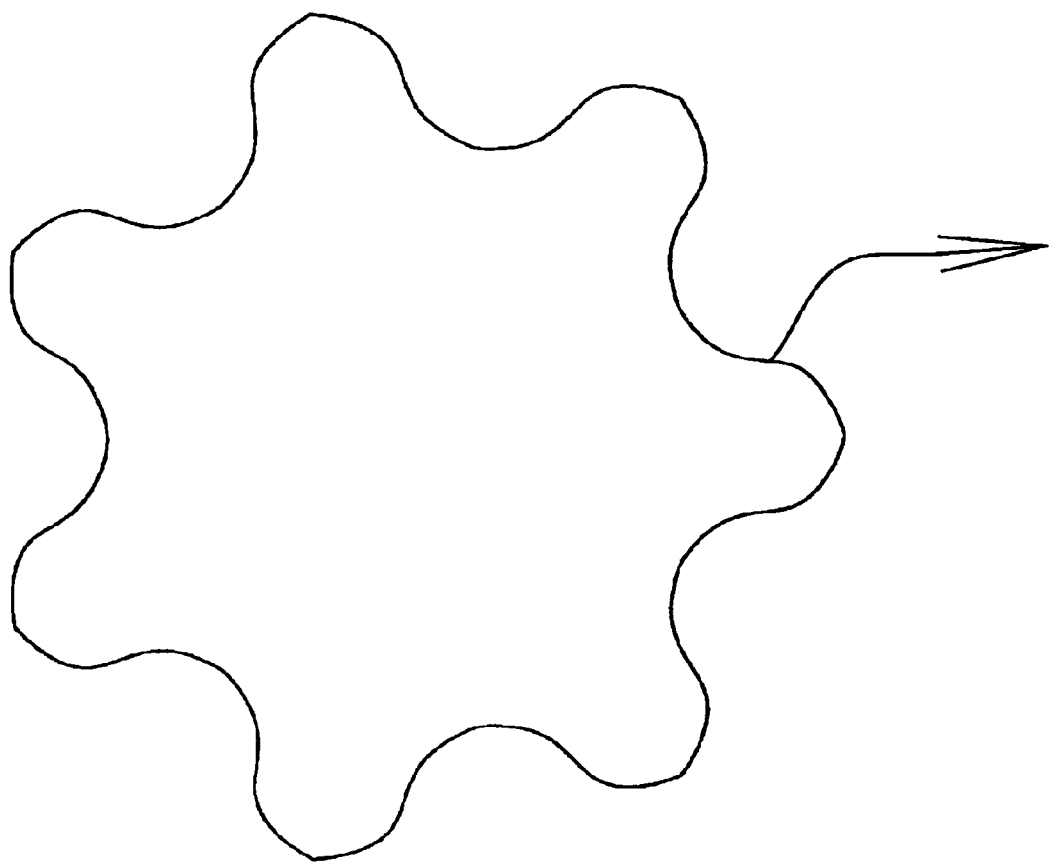
FIG. 5 is the pattern formed by spherical rotation of the second end of the air nozzle during seat occupant manipulation of the invention.

The means for spherically changing the output direction of the air nozzle moves the out put end of the air nozzle in the pattern shown in FIG. 5.

Figure 11:
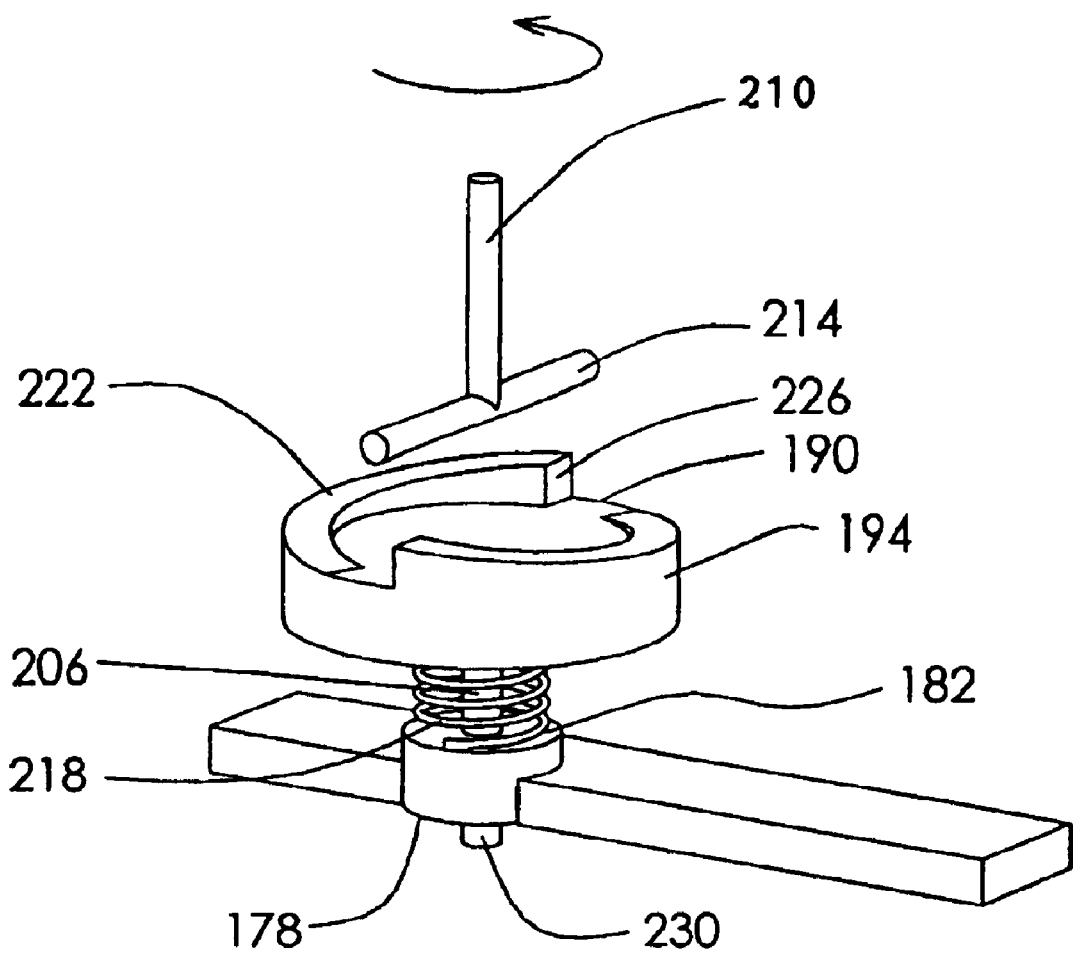
FIG. 11 is a magnified view of the upper engager-to-coupler interface.

In even another variation of this invention, shown in FIGS. 2, 7 and 11, the means for changing the volume of air output 38 by said air nozzle 18 also includes a bushing 178 with a top surface 182 and a central receiving hole 186. A coupler 190 is provided. The coupler 190 has a perimeter 194, a top surface 198, a bottom surface and a central rotation shaft 206. A drive shaft 210 is attached to an engager 214. The drive shaft 210 has a centerline. The engager 214 has a T shape. The central rotation shaft 206 is installed through a biasing means 218 and into and through the central receiving hole 186. The biasing means 218 pushes against the bottom surface of the coupler 190 and against the top surface 182 of the bushing 178. The coupler 190 has at least one ramp 222 with an end notch 226 concentrically located on the top surface 198 near the perimeter 194. The engager 214 is shaped, sized and located such that the centerline of the drive shaft 210 is co-linear to the centerline of the central rotation shaft 206 and the engager 214 is in contact with the at least one ramp 222. The at least one ramp 222 and end notch 226 are disposed such that when the engager 214 is rotated in a second direction, the engager 214 locks against the end notch 226 and rotates the coupler 190. A flexible shaft 230 is connected to the end of the central rotation shaft 206 that is sticking out through the bushing 178 central receiving hole 186. The flexible shaft 230 is connected concentrically to the at least one rotation pivot hinge 118 of the damper flap 114. Rotation of the central rotation shaft 206 results in a change in the damper flap 114 location and a change in the volume of air output by the air nozzle 18. When the engager 214 is rotated in the opposite direction, the engager 214 pushes against the at least one ramp 222 driving the coupler 190 against the biasing means 218. The engager 214 does not lock against the end notch 226. No rotation is imparted into the coupler 134.

The air nozzle 18 is capable of seat occupant manual over-ride adjustment instead of remote controlled adjustment.

The invention also resides in a remote controlled air conditioning nozzle 310 with three motors. The remote controlled air conditioning nozzle 310 includes a housing 314.

As shown in FIGS. 12, 13, 14 and 15, an air nozzle 318 is provided. The air nozzle 318 has a first pivotal connection 322 to the housing 314. The first pivotal connection has a first pivotal axis. The air nozzle 318 has a second pivotal connection to the housing 314. The second pivotal connection has a second pivotal axis. The second pivotal axis is perpendicular to the first pivotal axis. The air nozzle 318 has an air passageway with an input end 338 and an output end 342. The input end 338 has an outer surface 342. Conditioned air enters the input end 338 and exits the output end 342.

A first motor 346 is provided. The first motor 346 is disposed to propel a first means for pivoting the air nozzle about the first pivotal connection 350.

A second motor 354 is provided. The second motor 354 is disposed to propel a second means for pivoting the air nozzle about the second pivotal connection 358.

A third motor 358 is provided. The third motor 358 is disposed to propel a means for hanging the volume of air output 362 by the air nozzle 318.

A remote control is provided. The remote control directs the first means for pivoting the air nozzle about the first pivotal connection 350, the second means for pivoting the air nozzle about the second pivotal connection 358 and the changing of the volume of air output by the air nozzle 362.

In a variant of this invention, wherein the means for changing the volume of air output 362 has a worm drive gear 366 attached to the third motor 358. The worm receiver gear 366 is disposed in relation to the damping device 370 such that when driven by the worm gear 366, the volume of air output by the air nozzle 318 changes.

Figure 12:
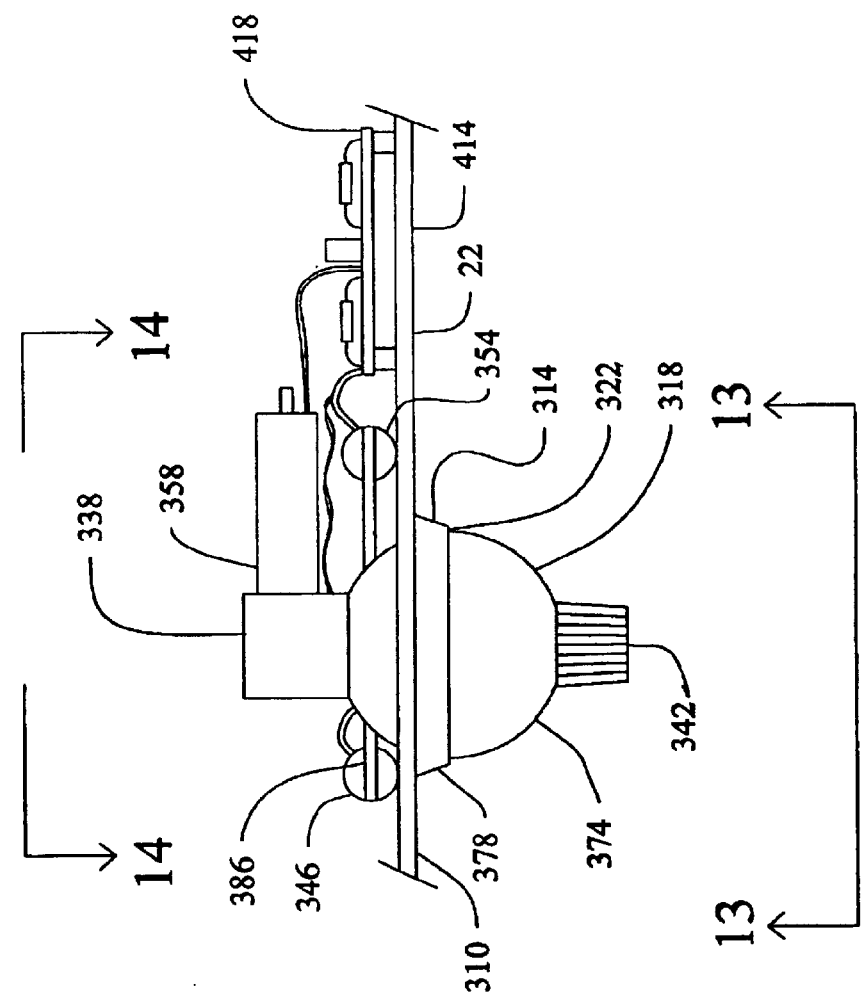
FIG. 12 is a side view of the three motor incarnation of the invention.
Figure 13:
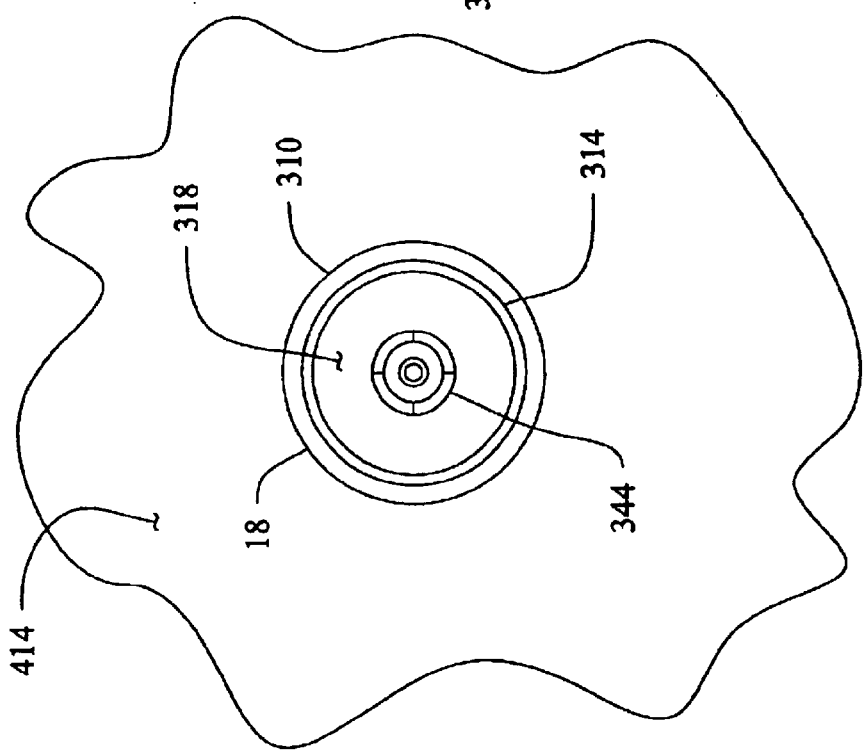
FIG. 13 is an aircraft interior view of the air nozzle.
Figures 14, 15:
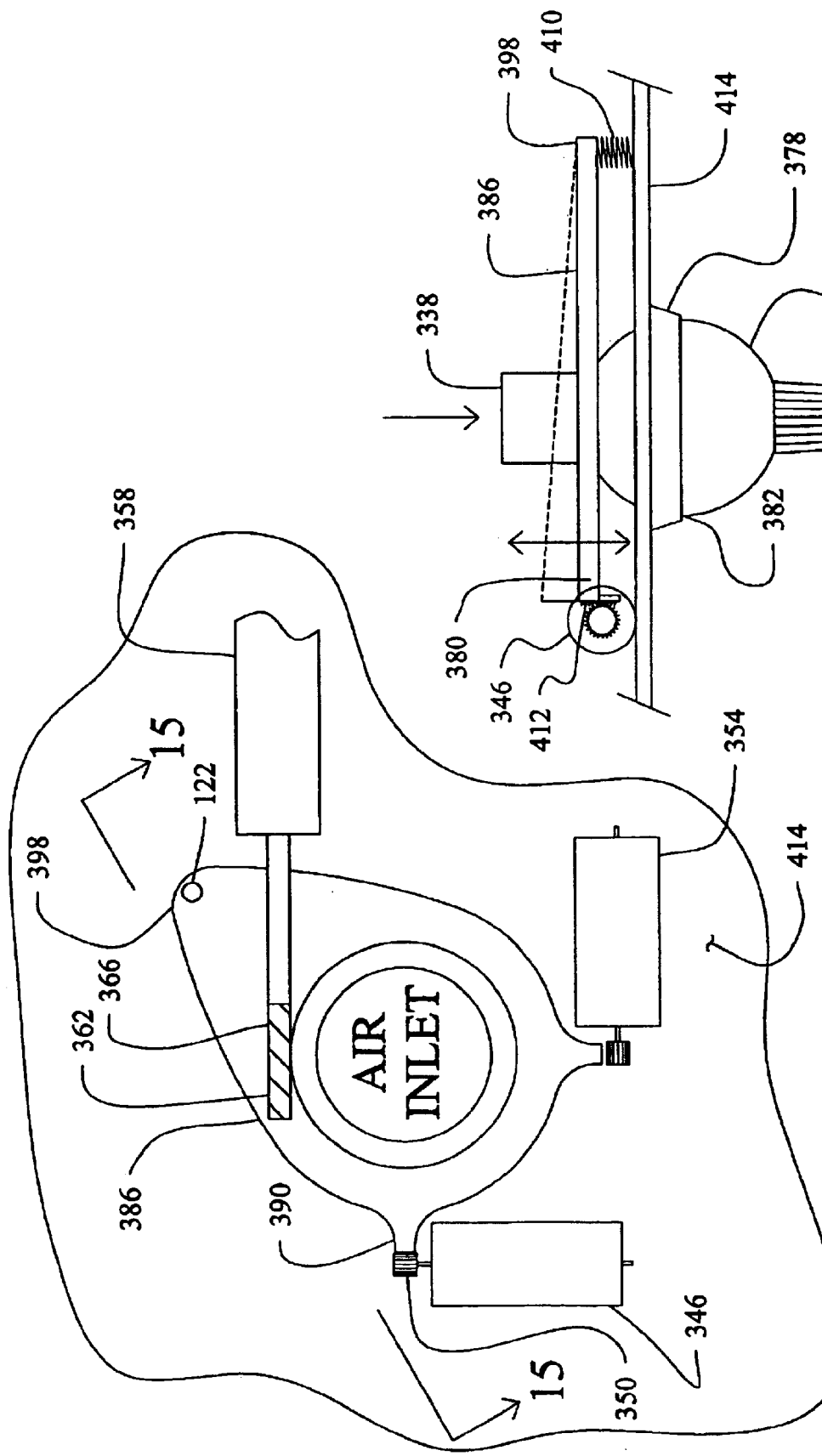
FIG. 14 is a plan view depicting each motor and each motors connection by a gear means to its respective corner of the swivel plate.
FIG. 15 is a side view of the first motor and the first motor connection by a gear means to the first corner of the swivel plate.

In another variant of this invention, shown in FIGS. 12 and 15, the air nozzle 318 has a spherical outer surface region 374. The spherical outer surface region 374 is cupped in a spherical socket 378 in the housing 324 thus forming the spherically pivotable connection 382.

In yet another variant of this invention, shown in FIGS. 14 and 15, a swivel plate 386 is sized, shaped and attached to the spherical outer surface region 374 such that the air nozzle 318 is sandwiched between the swivel plate 386 and the spherical socket 374. The swivel plate has a first corner 390, a second corner 394 and a third corner 398.

In still another variant of this invention, shown in FIGS. 14 and 15, the first motor 346 and the means for pivoting the air nozzle 350 about the first pivotal connection includes the first motor 346 being connected by a gear means 402 to the first corner 390 of the swivel plate 386. The second motor 354 and the means for pivoting the air nozzle 358 about the second pivotal connection further comprises the second motor 354 being connected by a gear means 406 to the second corner 394 of the swivel plate 386. The third corner 398 is attached by a biasing means 410 to a holding fixture 414. The first motor 346 and or the second motor 354 is directed by signals sent by the a remote control 366 to pivot the swivel plate 386 while the third corner 318 of the swivel plate 386 is fixed by the biasing means 410 resulting in the pivoting of the air nozzle 318 while holding the spherical outer surface region 374 in the cupping spherical socket 378.

In still another variant of this invention, the signals sent by the remote control 366 are transmitted from a central electronic control board 418.

In again another variant of this invention, the swivel plate 386 is orientated perpendicular to the direction of the output air.

In even another variant of this invention, the swivel plate 386 has a planar shape.

In a variation of this invention, the biasing means 410 is a spring.

The air nozzle 318 is capable of seat occupant manual over-ride adjustment instead of remote controlled adjustment.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

What is claimed is:

1. A remote controlled air conditioning nozzle, comprising:
    a housing;
    an air nozzle, said air nozzle having a first pivotal connection to said housing, said first pivotal connection having a first pivotal axis, said air nozzle having a second pivotal connection to said housing, said second pivotal connection having a second pivotal axis, said second pivotal axis being perpendicular to said first pivotal axis, said air nozzle having an air passageway with an input end and an output end, said input end having an outer surface, conditioned air enters said input end and exits said output end;
    a first motor being provided;
    said first motor being disposed to propel a first means for pivoting said air nozzle about said first pivotal connection;
    a second motor being provided;
    said second motor being disposed to propel a second means for pivoting said air nozzle about said second pivotal connection;
    a third motor being provided;
    said third motor being disposed to propel a means for changing said volume of air output by said air nozzle; and
    a remote control being provided, said remote control directs said first means for pivoting said air nozzle about said first pivotal connection, said second means for pivoting said air nozzle about said second pivotal connection and said changing of said volume of air output by said air nozzle.

2. The remote controlled air conditioning nozzle of claim 1, wherein said means for changing the volume of air output having a worm drive gear attached to said third motor, worm receiver gear being disposed in relation to said damping device such that when driven by said worm gear, the volume of air output by said air nozzle changes.

3. The remote controlled air conditioning nozzle of claim 1, wherein said air nozzle having a spherical outer surface region, said spherical outer surface region being cupped in a spherical socket in said housing thus forming said spherically pivotable connection.

4. The remote controlled air conditioning nozzle of claim 1, wherein a swivel plate being sized, shaped and attached to said outer surface of said air nozzle such that said air nozzle being sandwiched between said swivel plate and said spherical socket, said swivel plate having a first corner, a second corner and a third corner.

5. The remote controlled air conditioning nozzle of claim 4, wherein;
    said first motor and said first means for pivoting said air nozzle about said first pivotal connection further comprises said first motor being connected by a gear means to said first corner of said swivel plate;
    said second motor and said second means for pivoting said air nozzle about said second pivotal connection further comprises said second motor being connected by a gear means to said second corner of said swivel plate;
    said third corner being attached by a biasing means to said holding fixture; and
    said first motor and or said second motor being directed by signals sent by said remote control to pivot said swivel plate while said third corner of said swivel plate being fixed by said biasing means resulting in said air nozzle being pivoted while holding said spherical outer surface region into the cupping said spherical socket.

6. The remote controlled air conditioning nozzle of claim 4, wherein said signals sent by said remote control being transmitted from a central electronic control board.

7. The remote controlled air conditioning nozzle of claim 4, wherein said swivel plate being orientated perpendicular to the direction of the output air.

8. The remote controlled air conditioning nozzle of claim 4, wherein said swivel plate having a planar shape.

9. The remote controlled air conditioning nozzle of claim 4, wherein said biasing means being a spring.

* * * * *

UNITED STATES PATENT AND TRADEMARK OFFICE
CERTIFICATE OF CORRECTION

| | | |
|---|---|---|
| PATENT NO. | : 6,719,623 B1 | Page 1 of 1 |
| APPLICATION NO. | : 10/290864 | |
| DATED | : April 13, 2004 | |
| INVENTOR(S) | : Levik Kodaverdian | |

It is certified that error appears in the above-identified patent and that said Letters Patent is hereby corrected as shown below:

Title Page, item [75] inventors: Delete, "David Garakanian"

Signed and Sealed this

Fourth Day of September, 2007

JON W. DUDAS
*Director of the United States Patent and Trademark Office*